Sept. 16, 1958   J. A. PROCTOR   2,852,097
LUBRICATING DEVICE
Filed April 27, 1953

INVENTOR
JAMES A. PROCTOR
BY H. R. Johns
ATTORNEY

United States Patent Office 2,852,097
Patented Sept. 16, 1958

2,852,097

LUBRICATING DEVICE

James A. Proctor, Kenmore, N. Y., assignor to Union Carbide Corporation, a corporation of New York Application April 27, 1953, Serial No. 351,227

7 Claims. (Cl. 184—18)

This invention relates to an oxygen inert lubricating device such as rubbing blocks for piston lubrication in a compressor, and has for an object to provide such a lubricating device which has a wide operating temperature range, is stable, and is adapted for use in connection with products which might be contaminated from the usual liquid lubricant and is also adapted to be used with high concentrations of oxygen.

The lubrication of surfaces in the presence of liquid oxygen for example, has been a troublesome problem. The ordinary mineral oil lubricants cannot be used due to the explosive hazard. One suggestion has been the use of carbon impregnated with a metal capable of enhancing the wear resisting character of the carbon, but such has been open to the objection of needing moisture for the best operation. With gaseous oxygen soapy water as a lubricant has been suggested but this is also not free from the danger of causing an explosion. A solid lubricant such as powdered molybdenum disulphide and graphite have been known to be useful but they present a problem in feeding and distributing the lubricant to the surfaces where it is needed.

According to this invention the foregoing disadvantages have been eliminated and a lubricating device has been provided having its wear surface containing molybdenum disulphide with an inert plastic binder having a wider than usual operating temperature range. The only two such plastics which have been found suitable to meet these rigid requirements are the polytetrafluoroethylene sold under the Teflon brand and the chlorotrifluoroethylene known as fluorothene.

Referring to the drawing.

Figure 1:
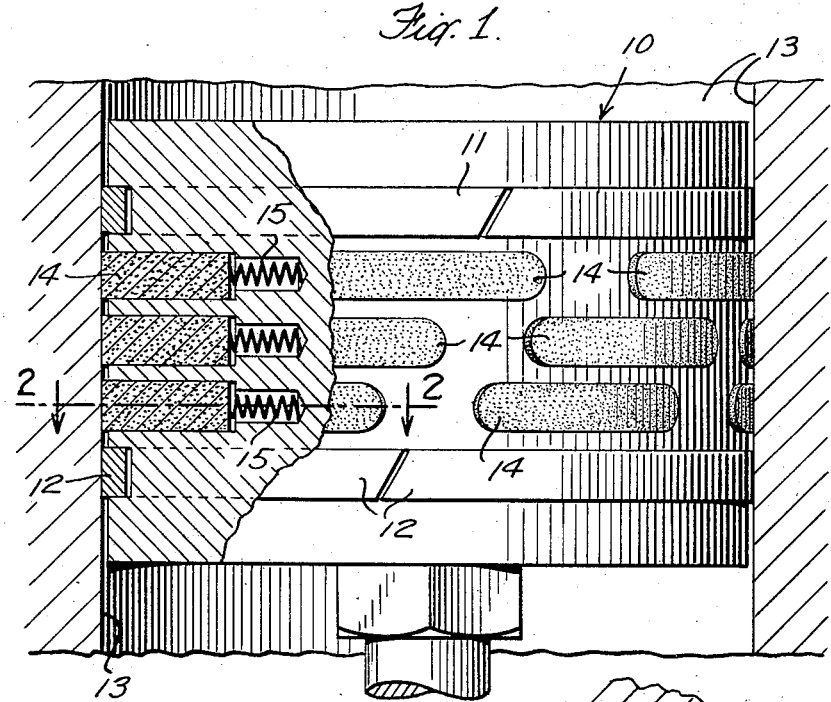
Fig. 1 is a side elevation partly in section of a piston having rubbing blocks as the lubricating device of the present invention.
Figure 3:
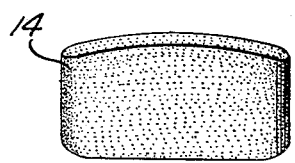
Fig. 3 is a perspective of one of the rubbing blocks.
Figure 2:
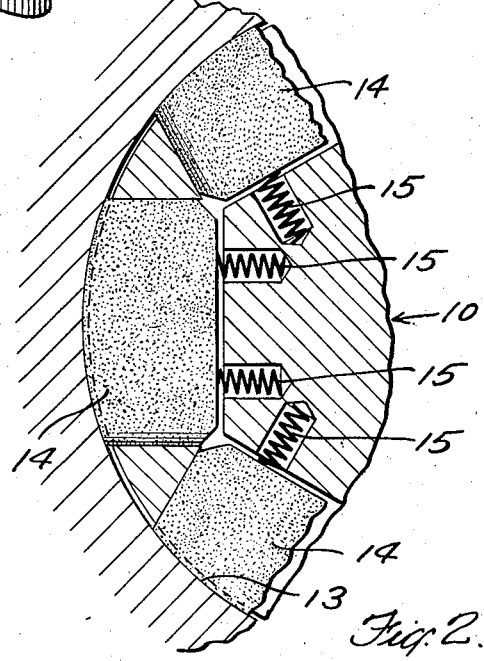
Fig. 2 is a section on the line 2—2 of Fig. 1.

As shown in Fig. 1 a compressor piston 10 is provided with the usual cast iron piston rings 11 and 12 sliding within the inner surface 13 of the cylinder illustrated. A number of lubricating blocks 14 made as later described are located between the piston rings and arranged to overlap both peripherally and longitudinally. In this way when the piston reciprocates some of the lubricant from the blocks 14 is deposited on the cylinder walls 13 to insure lubrication of the rings 11 and 12 as they move across the lubricated surface 13. As shown in the drawing each block 14 is received in an appropriately shaped recess in the piston to provide a freely slidable reception of the block in its recess. Between each block and the body of the piston are springs 15 for resiliently urging the blocks outwardly.

The lubricating device of this invention is formed from molybdenum disulphide powdered to a fineness of about 6 microns with powdered polytetrafluoroethylene or fluorothene of about the same fineness, intimately mixed and molded under suitable heat and pressure as is familiar to those skilled in the art of molding these plastics. The plastic bonds the particles of molybdenum disulphide. For the lubricating blocks 14 it has been found that 5 percent to 25 percent of the plastic gives the best results as a compromise between fragility and wear. Less than 75 percent molybdenum disulphide in the rubbing block does not seem to impart as much lubrication as is desirable.

It was at first thought that a rough honed cylinder wall would perhaps be most advantageous in the formation of an appropriate film of lubricant but experience showed that this was not the case, since such a rough surface gave excessive wear in the rubbing block and piston rings. It has been found that an average cylinder wall roughness of not more than 12 micro-inches is desirable for rubbing block use. Tests made with varying percentages of the molybdenum disulphide in operation as rubbing blocks for the hours indicated were computed to obtain the extrapolated ring life shown in the last column of the following table by measuring the increase in gap of the piston ring as an indication of its probable useful life:

| Percent MoS₂ | Hours Operation | Ring Gap Increase, Inches | Extrapolated Ring Life, Hrs. |
|---|---|---|---|
| 100% | 102 | 0.003 | 1,000* |
| 95% | 112 | 0.0005 | 11,000 |
| 90% | 113 | 0.0015 | 2,000 |
| 75% | 140 | 0.008 | 500 |

In this test the rubbing block composition was molybdenum disulphide and fluorothene but Teflon brand of plastic has been found to be an equivalent binder for many uses. The discharge pressure under which the compressor worked was 100 lbs. per square inch handling air, the piston rings being cast iron. Another test on a compressor pumping oxygen under 150 lbs. per square inch pressure, disclosed that the ratio of rubbing area of the lubricating blocks to the rubbing area in the rings was an important feature and that this ratio should be about unity or larger. The preferred 90% molybdenum disulphide content for the rubbing blocks is a compromise between piston ring wear and the danger of rupture in the lubricant blocks and has been demonstrated for example, by two graphs. In one of those graphs piston ring life as the ordinate was plotted against percentage of plastic content of the blocks as abscissa. For the other graph modulus of rupture was plotted against the same abscissa and it was found that these two curves intersect at a point in which the plastic content was substantially 10 percent thus making the molybdenum disulphide content 90 percent.

The desired pressure in pounds per square inch on each block was also discovered by the use of intersecting graphs. For one such graph the ring wear rate per 100 hours as ordinate was plotted against unit block pressure in pounds per square inch. For a second curve the block wear rate per 100 hours was plotted against the same abscissa. It was found these two curves intersect at a point indicating a block unit pressure of approximately 1 pound per square inch.

A special advantage of the lubricating device of this invention is its adaptability to withstand a higher operating temperature than is the case with any other proposed plastic bonded molybdenum disulphide. An operating temperature of at least 450° F. is possible with the lubricating device having either of the two mentioned plastics. This temperature is 100° to 150° F. higher than the maximum operating temperature of any other practical lubricating device known with the advantages mentioned previously. Where higher operating temperatures are encountered fluorothene will be the preferred binder for the molybdenum disulphide because the Teflon brand plastic is known to decompose at about 550° F. giving off a toxic gas whereas fluorothene decomposes without the emission of an appreciable quantity of toxic gas. The adaptability of this lubricating device to withstand low temperatures is also important. Unlike other lubricating devices, that of this invention requires a substantially constant torque to move the dry lubricated bearing surfaces at as low a temperature as —50° F. as has been shown by tests and it is believed the same continues at far lower temperatures, whereas liquid or grease type lubricants require increasing torque at decreasingly lower temperatures. Unlike some plastic bonds previously suggested, these two mentioned bonds for the molybdenum disulphide have lubricating properties of their own in addition to those of the molybdenum disulphide.

A melt viscosity for the fluorothene of between 5 and 50 megapoises at 230° C. was found acceptable. The chemical similarity in these two plastics is observable from the formula of each; that for the Teflon brand plastic is $(C_2F_4)_x$ and that for the fluorothene is $(C_2F_3Cl)_x$. Both plastics named herein are polymers of a tetrahaloethylene in which at least three of the halogen atoms are fluorine atoms and the remaining halogen atom is selected from the group consisting of chlorine and fluorine.

What is claimed is:

1. In a reciprocating piston and cylinder mechanism of the type in which at least one sealing ring is maintained in reciprocating contact with a cylindrical wall during relative reciprocal movement between the ring and the wall, the combination therewith of means for maintaining a solid lubricating film between said ring and the cylindrical wall which comprises at least one lubricating rubbing block supported adjacent to said ring so that a rubbing surface of said block is held in reciprocating contact with said cylindrical wall, said block having at least the rubbing surface portion thereof constituted of a mixture of 75% to 95% by weight of molybdenum disulphide, and the balance an oxygen inert lubricating thermoplastic binder which is the polymer of a tetrahaloethylene in which three of the halogen atoms are fluorine and the remaining halogen atom is selected from the group consisting of chlorine and fluorine, said plastic binder having film-forming qualities such as to provide and maintain on the wall surface a film comprising molybdenum disulphide particles bonded by said plastic which film is substantially inert to oxygen and operable when subject to extremely low temperatures as well as high temperatures at least as high as 450° F.

2. A mechanism according to claim 1 in which the rubbing surface portion of said block comprises a composition of about 90% by weight of molybdenum disulphide and about 10% of said plastic.

3. A mechanism according to claim 1 in which said rubbing block is movable toward said cylindrical wall and resilient means is provided for constantly urging said block toward said wall with a force which provides a pressure of about one pound per square inch of the rubbing surface of the block in contact with the wall.

4. A mechanism according to claim 1 in which said cylindrical wall is provided with a working surface having a surface roughness of substantially not more than 12 micro-inches, said rubbing block is movable toward said cylindrical wall and resilient means is provided for constantly urging said block toward said wall with a force which provides a pressure of about one pound per square inch of the rubbing surface of the block in contact with the wall.

5. A mechanism according to claim 1 in which the rubbing surface portion of said block comprises a composition of 80% to 95% by weight of molybdenum disulphide and substantially the remainder is a binder of said plastic.

6. In a reciprocating piston and cylinder mechanism of the type in which at least two sealing rings are maintained in reciprocating contact with a cylindrical wall during relative reciprocal movement between the rings and the wall, the combination therewith of means for maintaining a solid lubricating film between said rings and the cylindrical wall which comprises a plurality of lubricating rubbing blocks having arcuate outer rubbing surfaces, said blocks being disposed between longitudinally displaced outer ones of said sealing rings and in overlapping arrangement so as to rub an entire annular working surface of said cylindrical wall, means for movably supporting said blocks and resiliently urging said blocks toward said cylindrical wall for maintaining said arcuate rubbing surfaces in reciprocating contact with said wall, each of said blocks having at least the rubbing surface portion thereof constituted of a mixture of 75% to 95% by weight of molybdenum disulphide, and the balance an oxygen inert lubricating thermoplastic binder which is the polymer of a tetrahaloethylene in which three of the halogen atoms are fluorine and the remaining halogen atom is selected from the group consisting of chlorine and fluorine, said plastic binder having film-forming qualities such as to provide and maintain on the wall surface a film comprising molybdenum disulphide particles bonded by said plastic which film is substantially inert to oxygen and operable when subject to extremely low temperatures as well as high temperatures at least as high as 450° F.

7. A mechanism according to claim 6 in which the ratio of the total rubbing surfaces of said blocks in contact with said wall to the total surface of said sealing rings in contact with said wall is at least about unity.

References Cited in the file of this patent

UNITED STATES PATENTS

| | | |
|---|---|---|
| 1,579,409 | Smith | Apr. 6, 1926 |
| 2,400,091 | Alfthan | May 14, 1946 |
| 2,468,171 | Carlson | Apr. 26, 1949 |
| 2,600,321 | Pyle | June 10, 1952 |
| 2,686,155 | Willis | Aug. 10, 1954 |

FOREIGN PATENTS

| | | |
|---|---|---|
| 525,682 | Great Britain | Sept. 3, 1940 |

OTHER REFERENCES

Publication, Molybdenum Disulphide as a Lubricant (Climax Molybdenum Co., 500 Fifth Ave., New York), page 50, Patent Office dated February 11, 1952.